(12) United States Patent
Wang et al.

(10) Patent No.: US 8,154,790 B2
(45) Date of Patent: Apr. 10, 2012

(54) ELECTROPHORETIC DISPLAY STRUCTURES

(75) Inventors: Xiaojia Wang, Fremont, CA (US); Robert A. Sprague, Saratoga, CA (US); Gary Yih-Ming Kang, Fremont, CA (US)

(73) Assignee: Sipix Imaging, Inc., Fremont, CA (US)

( * ) Notice: Subject to any disclaimer, the term of this patent is extended or adjusted under 35 U.S.C. 154(b) by 0 days.

(21) Appl. No.: 12/606,974

(22) Filed: Oct. 27, 2009

(65) Prior Publication Data

US 2010/0103501 A1 Apr. 29, 2010

Related U.S. Application Data

(60) Provisional application No. 61/109,154, filed on Oct. 28, 2008.

(51) Int. Cl.
*G02B 26/00* (2006.01)
*G09G 3/34* (2006.01)
*G03G 17/04* (2006.01)

(52) U.S. Cl. ............... 359/296; 345/107; 430/32

(58) Field of Classification Search ............ 359/296, 359/245, 253–254, 265, 290–291; 349/33; 345/107; 430/31–32
See application file for complete search history.

(56) References Cited

U.S. PATENT DOCUMENTS

| | | | |
|---|---|---|---|
| 4,655,897 A * | 4/1987 | DiSanto et al. | 359/296 |
| 6,515,790 B2 * | 2/2003 | Miyamoto et al. | 359/296 |
| 6,791,655 B2 * | 9/2004 | Enomoto et al. | 349/156 |
| 6,829,078 B2 | 12/2004 | Liang et al. | |
| 6,930,818 B1 | 8/2005 | Liang et al. | |
| 7,046,228 B2 | 5/2006 | Liang et al. | |
| 7,495,821 B2 * | 2/2009 | Yamakita et al. | 359/296 |
| 2005/0190431 A1 * | 9/2005 | Matsuda | 359/296 |
| 2008/0198443 A1 * | 8/2008 | Yoshimura et al. | 359/296 |

OTHER PUBLICATIONS

Allen, K. (Oct. 2003). Electrophoretics Fulfilled. *Emerging Displays Review: Emerging Display Technologies*, Monthly Report—October 2003, 9-14.
Bardsley, J.N. & Pinnel, M.R. (Nov. 2004) Microcup™ Electrophoretic Displays. *USDC Flexible Display Report*, 3.1.2. pp. 3-12-3-16.
Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814,19.6.1.
Chen, S.M. (Jul. 2003) The Applications for the Revolutionary Electronic Paper Technology. *OPTO News & Letters*, 102, 37-41. (in Chinese, English abstract attached).
Chen, S.M. (May 2003) The New Application and the Dynamics of Companies. *TRI*. 1-10. (In Chinese, English abstract attached).
Chung, J., Hou, J., Wang, W., Chu, L.Y., Yao, W., & Liang, R.C. (Dec. 2003,). Microcup® Electrophoretic Displays, Grayscale and Color Rendition. *IDW*, AMD2/EP1-2, 243-246.

(Continued)

*Primary Examiner* — Dawayne A Pinkney
(74) *Attorney, Agent, or Firm* — Perkins Coie LLP.

(57) ABSTRACT

This invention relates to a display device comprising a plurality of display cells, wherein said display cells are separated by slanted partition walls. This invention also relates to a display device comprising a plurality of display cells, wherein said display cells are separated by indented partition walls having indented areas. The electrophoretic structures of the present invention may be manufactured by a continuous or semi-continuous roll-to-roll manufacturing process. The structures in which display cells are separated by slanted partition walls or partition walls having indented areas are capable of providing enhanced color states.

20 Claims, 14 Drawing Sheets

OTHER PUBLICATIONS

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Ho, C.,& Liang, R.C. (Dec. 2003). *Microcup® Electronic Paper by Roll-to-Roll Manufacturing Processes*. Presentation conducted at FEG, Nei-Li, Taiwan.

Ho, Candice. (Feb. 1, 2005) *Microcupt® Electronic Paper Device and Applicaiton*. Presentation conducted at USDC 4th Annual Flexible Display Conference 2005.

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Kao, WC., (Feb. 2009) Configurable Timing Controller Design for Active Matrix Electrophoretic Dispaly. *IEEE Transactions on Consumer Electronics*, 2009, vol. 55, Issue 1, pp. 1-5.

Kao, WC., Fang, CY., Chen, YY., Shen, MH., and Wong, J. (Jan. 2008) Integrating Flexible Electrophoretic Display And One-Time Password Generator in Smart Cards. *ICCE 2008 Digest of Technical Papers*, p. 4-3. (Int'l Conference on Consumer Electronics, Jan. 9-13, 2008).

Kao, WC., Ye, JA., and Lin, C. (Jan. 2009) Image Quality Improvement for Electrophoretic Displays by Combining Contrast Enhancement and Halftoning Techniques. *ICCE 2009 Digest of Technical Papers*, 11.2-2.

Kao, WC., Ye, JA., Chu, MI., and Su, CY. (Feb. 2009) Image Quality Improvement for Electrophoretic Displays by Combining Contrast Enhancement and Halftoning Techniques. *IEEE Transactions on Consumer Electronics*, 2009, vol. 55, Issue 1, pp. 15-19.

Kao, WC., Ye, JA., Lin, FS., Lin, C., and Sprague, R. (Jan. 2009) Configurable Timing Controller Design for Active Matrix Electrophoretic Display with 16 Gray Levels. *ICCE 2009 Digest of Technical Papers*, 10.2-2.

Lee, H. & Liang, R.C. (Jun. 2003) SiPix Microcup® Electronic Paper—An Introduction. *Advanced Display*, Issue 37, 4-9 (in Chinese, English abstract attached).

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Displays/Electronic Paper—A Technology Overview*. Paper presented at the METS 2004 Conference in Taipie, Taiwan.

Liang, R.C., & Tseng, S. (Feb. 2003). *Microcup® LCD, A New Type of Dispersed LCD by A Roll-to-Roll Manufacturing Process*. Paper presented at the IDMC, Taipei, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (May 2003). Microcup® Active and Passive Matrix Electrophoretic Displays by A Roll-to-Roll Manufacturing Processes. *SID Digest*, vol. 34, Issue 1, pp. 838-841, 20.1.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., Hou, J., Zang, H.M., Chung, J., & Tseng, S. (2003). Microcup® displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.

Nikkei Microdevices. (Dec. 2002) Newly-Developed Color Electronic Paper Promises—Unbeatable Production Efficiency. *Nikkei Microdevices*, p. 3. (in Japanese, with English translation).

Sprague, R.A. (Sep. 23, 2009) SiPix Microcup Electrophoretic Epaper for Ebooks. *NIP 25 Technical Programs and Proceedings*, 2009 pp. 460-462.

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display*. the Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, OOpp. 1587-1589.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging, SPIE* vol. 5289, 102-108.

Zang, H.M. & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, H.M. (Oct. 2003). *Microcup® Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M., & Liang, R.C. (2003) Microcup Electronic Paper by Roll-to-Roll Manufacturing Processes. *The Spectrum*, 16(2), 16-21.

Zang, HM., (Feb. 2007) *Developments in Microcup® Flexible Displays*. Presentation conducted at the 6th Annual Flexible Display and Microelectronics Conference, Phoenix, AZ Feb. 6-8.

Zang, HM., (Sep. 2006) *Monochrome and Area Color Microcup® EPDs by Roll-to-Roll Manufacturing Process*. Presentation conducted at the Forth Organic Electronics Conference and Exhibition (OEC-06), Sep. 25-27, 2006, Frankfurt, Germany.

Zang, HM., Wang, F., Kang, Y.M., Chen, Y., and Lin, W. (Jul. 2007) *Microcup® e-Paper for Embedded and Flexible Designs*. IDMC'07, Taipei International Convention Center, Taiwan.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

\* cited by examiner

ELECTROPHORETIC DISPLAY STRUCTURES

This application claims priority to U.S. Provisional Application No. 61/109,154, filed Oct. 28, 2008; the content of which is incorporated herein by reference in its entirety.

BACKGROUND

An electrophoretic display (EPD) is a non-emissive device based on the electrophoresis phenomenon influencing charged pigment particles suspended in a solvent. An EPD typically comprises a pair of electrodes, with at least one of the electrodes, typically on the viewing side, being transparent. An electrophoretic fluid composed of a colored dielectric solvent and charged pigment particles dispersed therein is enclosed between the two electrodes.

An improved EPD technology and a roll-to-roll manufacturing process are disclosed in U.S. Pat. No. 6,930,818, the content of which is incorporated herein by reference in its entirety.

For full color displays with the normal up/down switching mode, color filters overlaid on the viewing side of the display may be used. However, poor whiteness and lack of a high quality "black" state are the major problems for reflective color displays using color filters.

Therefore, there is still a need for an improved EPD with high quality full color capability that can also be manufactured in an efficient manner, particularly by a roll-to-roll manufacturing process.

SUMMARY OF THE INVENTION

The present invention provides novel display structures.

The first aspect of the invention is directed to a display device comprising a plurality of display cells wherein the display cells are separated by slanted partition walls. In one embodiment, the display cells are filled with an electrophoretic display fluid comprising charged pigment particles dispersed in a dielectric solvent or solvent mixture. In one embodiment, the electrophoretic display fluid comprises one type of charged pigment particles. In one embodiment, the electrophoretic display fluid comprises two types of charged pigment particles. In one embodiment, the partition walls are of a dark opaque color. In one embodiment, the partition walls are formed from a composition comprising air pockets or a filler material. In one embodiment, the filler material is non-conductive carbon black, pigment black, silica, ZnO, TiO$_2$, BaSO$_4$, CaCO$_3$ or polymer particles. In one embodiment, the display is capable of displaying the color of the charged pigment particles, the color of the solvent or solvent mixture, or the color of a background layer. In one embodiment, the color of the background layer is black. In one embodiment, the display is capable of displaying a binary color system. In one embodiment, the slanted partition walls have an angle in the range of about 25° to about 80°. In one embodiment, the total active area is at least about 50% of the total area of the viewing surface.

The second aspect of the present invention is directed to a display device comprising a plurality of display cells wherein the display cells are separated by indented partition walls having indented areas. In one embodiment, the display cells are filled with an electrophoretic display fluid comprising charged pigment particles dispersed in a dielectric solvent or solvent mixture. In one embodiment, the electrophoretic display fluid comprises one type of charged pigment particles. In one embodiment, the electrophoretic display fluid comprises two types of charged pigment particles.

In one embodiment, the indented partition walls do not have open passageways. In one embodiment, each display cell comprises one or more indented partition walls. In one embodiment, the display is capable of displaying the color of the charged pigment particles, the color of the solvent or solvent mixture, or the color of a background layer. In one embodiment, the thickness of the indented area is about 5% to about 80% of the total thickness of the partition wall. In one embodiment, the height of the indented area is about 5% to about 80% of the height of the partition wall. In one embodiment, the indented areas are of a rectangular shape. In one embodiment, the indented areas are of a rectangular shape with an arched top.

In one embodiment, the indented partition walls are open partition walls having open areas. In one embodiment, the ceiling of the open areas is painted black. In one embodiment, the open areas are of a rectangular shape. In one embodiment, the open areas are of a rectangular shape with an arched top. In one embodiment, the height of the open areas is about 5% to about 80% of the height of the partition wall. In one embodiment, the display is a striped color display. In one embodiment, the open partition walls randomly appear in the display.

The electrophoretic display structures of the present invention may be manufactured by a continuous or semi-continuous roll-to-roll manufacturing process. The structures are capable of providing enhanced color states.

BRIEF DESCRIPTION OF THE DRAWINGS

It is noted that all figures are shown as schematic and are not to scale.

DETAILED DESCRIPTION OF THE INVENTION

Figure 1:
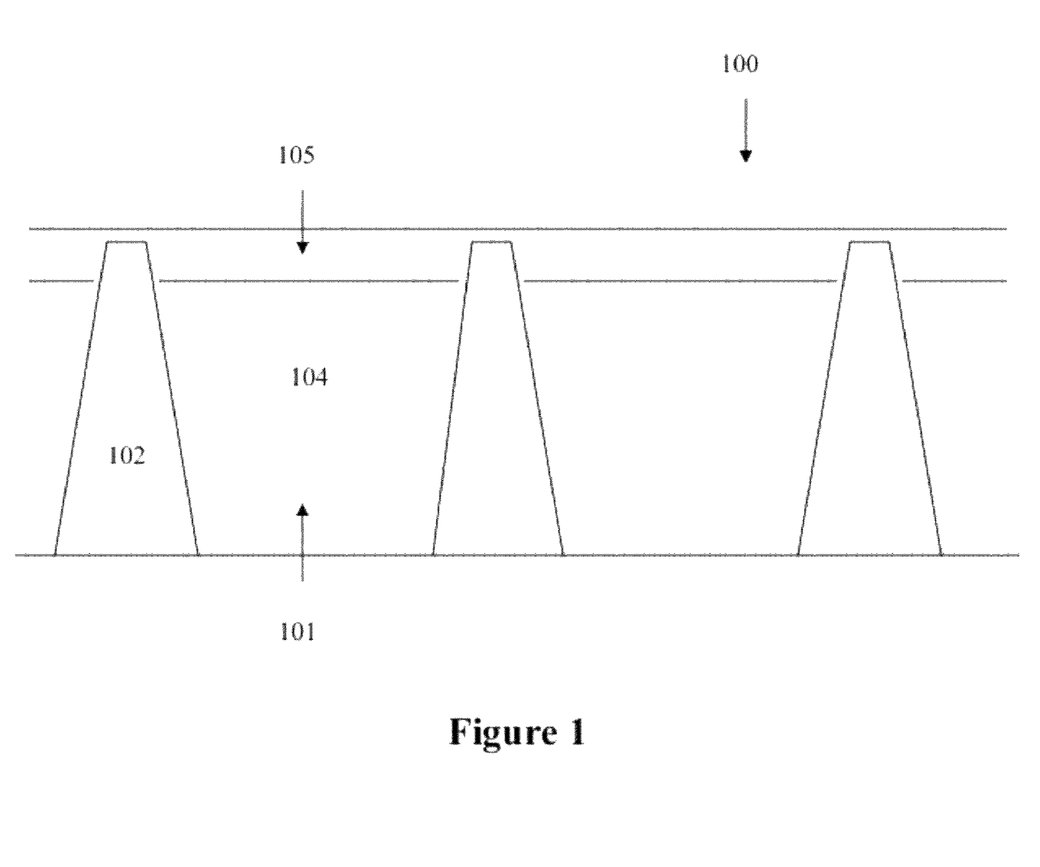
FIG. 1 is a cross-section view of an electrophoretic display structure having slanted partition walls.

The first aspect of the present invention is directed to an electrophoretic display structure (100) having trapezoid-shaped partition walls, as shown in FIG. 1. The display cells (or microcups) (101) are separated by the trapezoid-shaped partition walls (102). The trapezoid-shaped partition walls may also be referred to as the slanted partition walls. The display cells are then filled with an electrophoretic fluid (104) and optionally sealed with a polymeric sealing layer (105).

It is preferable for the slanted partition walls to have an opaque color, especially a gray opaque color. This may be achieved by introducing air pockets or a filler material such as non-conductive carbon black, pigment black, silica, ZnO, $TiO_2$, $BaSO_4$, $CaCO_3$ or polymer particles, preferably non-conductive carbon black or pigment black, preferably in the amount of 0.01-20% by weight, more preferably in the amount of 0.01-10% by weight, into the composition for the formation of the display cells. Colored pigments may also be used to create special appearance.

Figure 2:
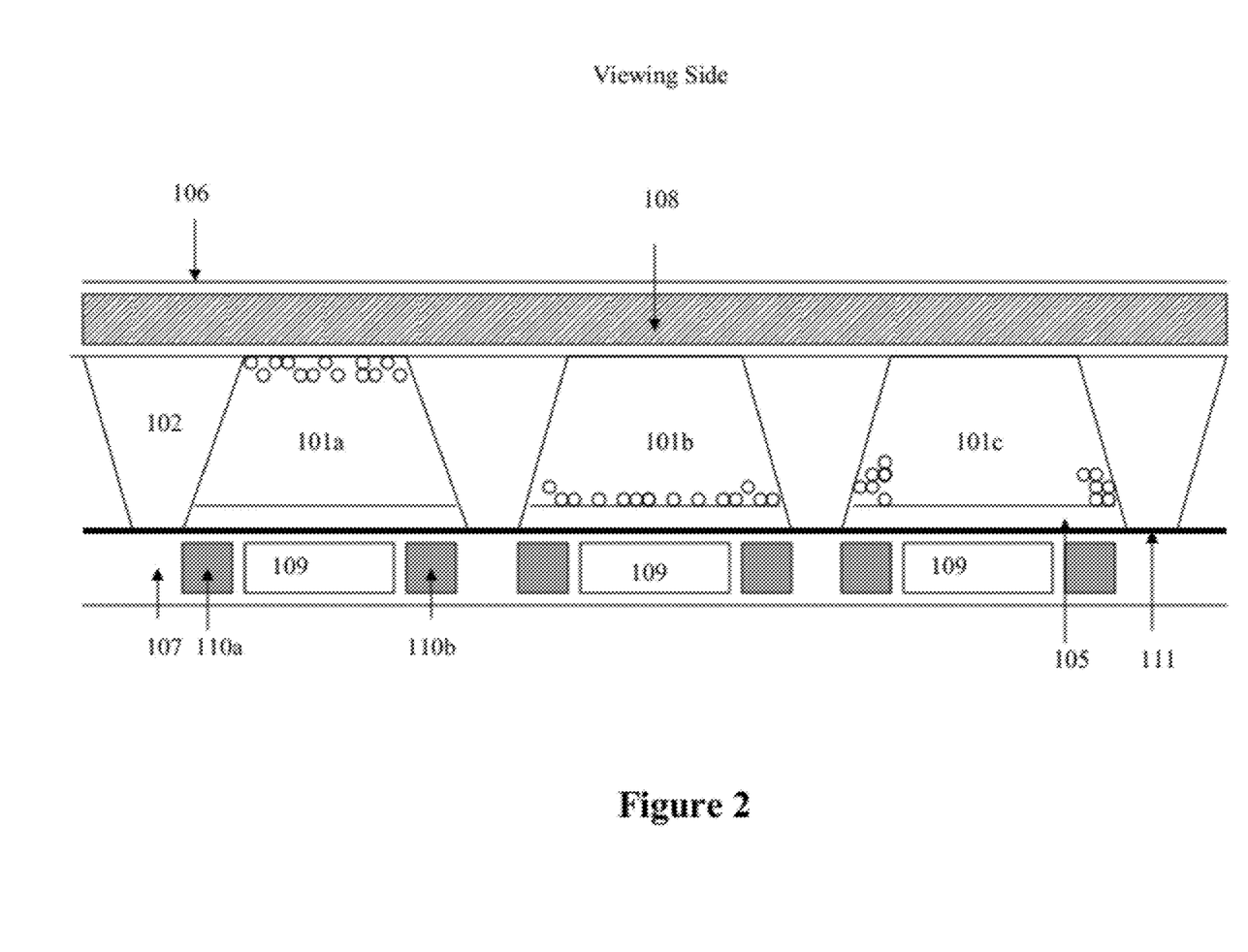
FIG. 2 is a cross-section view of an electrophoretic display capable of displaying multiple color states.

FIG. 2 illustrates a full color display utilizing the structure of FIG. 1. In FIG. 2, the structure of FIG. 1 has been turned 180°. In other words, the side opposite of the sealing layer (105) is now the viewing side.

For illustration purpose, there are only three display cells shown. Each of the display cells is sandwiched between a first layer (106) and a second layer (107). The first layer (106) comprises a common electrode (108) (i.e., the ITO layer). The second layer (107) comprises a center electrode and at least one side electrode for each display cell. In FIG. 2, there are two side electrodes (110a and 110b) on each side of the center electrode (109) for each display cell. The center electrode and the side electrodes are not in contact with each other.

The common electrode (108) may be an entire piece of ITO layer spreading across the display cells.

There is a black background layer (111) which is above the second layer (107). It is also possible to have the black background layer underneath the second layer or the second layer may itself serve as a black background layer.

Typically, the display cells are filled with a display fluid comprising a colored (e.g., red, green or blue) dielectric solvent or solvent mixture with white particles dispersed therein. The charged particles in each display cell may be of the same color or of different colors. Particles of mixed colors, when substantially evenly distributed, may be seen as one color, i.e., a composite color of different colors.

The particles may be positively or negatively charged.

Alternatively, the display fluid could also have a transparent or lightly colored solvent or solvent mixture and charged particles of two different colors carrying opposite charges, and/or having differing electro-kinetic properties. For example, there may be white pigment particles which are positively charged and black pigment particles which are negatively charged and the two types of pigment particles are dispersed in a clear solvent or solvent mixture.

The display cells are separated by slanted partition walls (102).

For the purpose of illustration, it is assumed that the particles in FIG. 2 and other figures are positively charged, throughout this application.

As shown in FIG. 2, the positively charged pigment particles are allowed to move in either the vertical (up/down) direction or the planar (left/right) direction. For example, for display cell 101a, when the voltage of the common electrode (108) is set low, and the voltages of the center electrode (109) and the side electrodes (110a and 110b) are set high, the white particles would migrate to be near or at the common electrode (108). As a result, the white color (i.e., the color of the particles) is seen at the viewing side.

In display cell 101b, when the voltage of the common electrode (108) is set high and the voltages of the center electrode (109) and side electrodes (110a and 110b) are set low, the white particles would migrate to be near or at the bottom of the display cell. As a result, the color of the fluid (e.g., red, green or blue) would be seen at the viewing side.

In display cell 101c, when the voltages of the side electrodes (110a and 110b) are set low and the voltages of the common (108) and center (109) electrodes are set high, the white particles would migrate to be near or at the sides of the display cell. As a result, the color seen at the viewing side would be the color of the background layer (111) (i.e., black). In this current structure, the white charged pigment particles are hidden under the slanted partition walls (102), and therefore are not visible from the viewing side.

The full color displays of the present invention may be driven by an active matrix system or a passive matrix system as described in U.S. Pat. No. 7,046,228, the content of which is incorporated herein by reference in its entirety.

Figure 3:
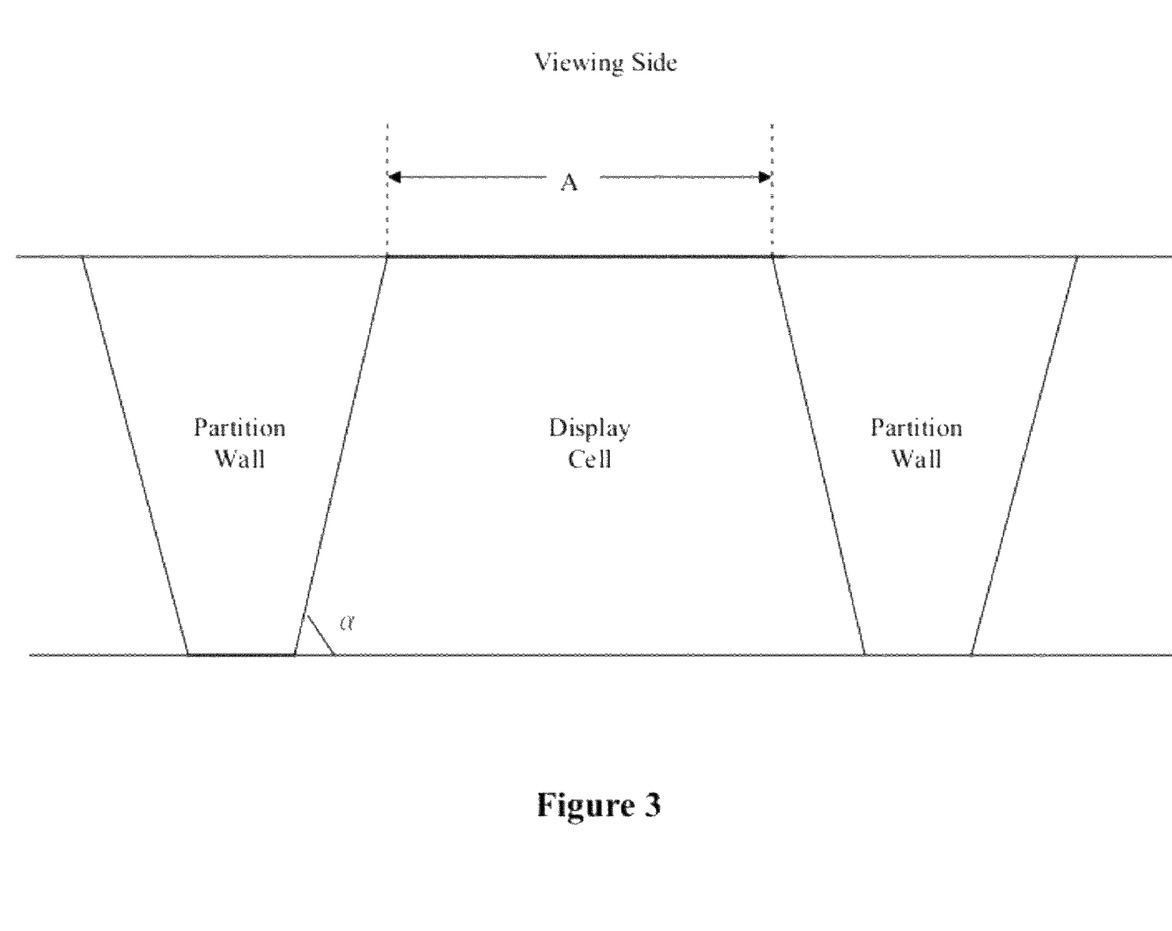
FIG. 3 shows the dimensions of an electrophoretic display having slanted partition walls.

FIG. 3 illustrates the dimensions of the electrophoretic display structure of FIG. 1. In a full color display, the total active area (mark A in the figure) is preferably at least about 50% of the total area of the viewing surface. The term "active area" refers to the area which is not part of the partition walls.

The angle α of the slanted partition walls is preferably in the range of about 25° to about 80°, more preferably in the range of about 50° to about 80°.

Figure 4A:
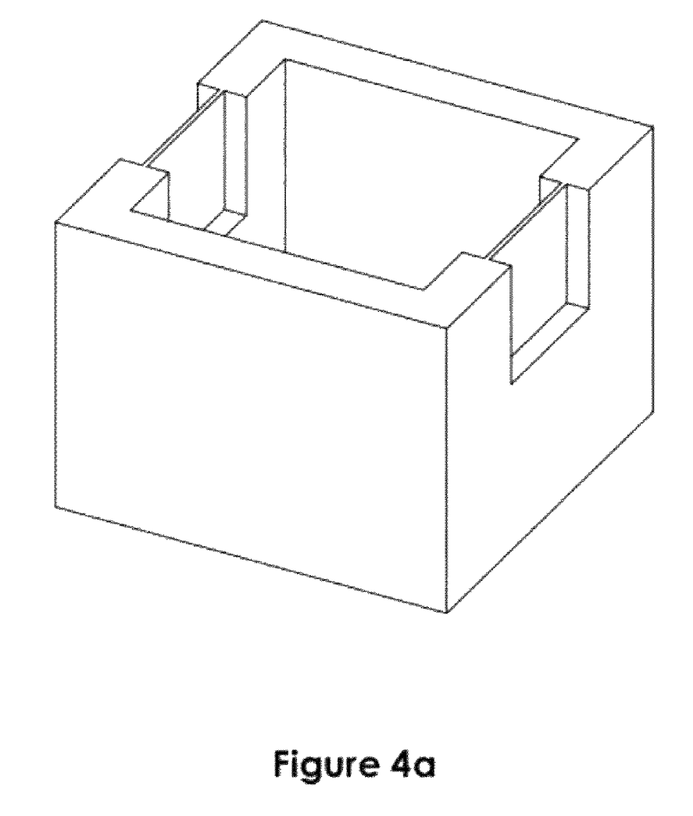
FIGS. 4a and 4b are three-dimensional view of an electrophoretic display having indented partition walls.
Figure 4B:
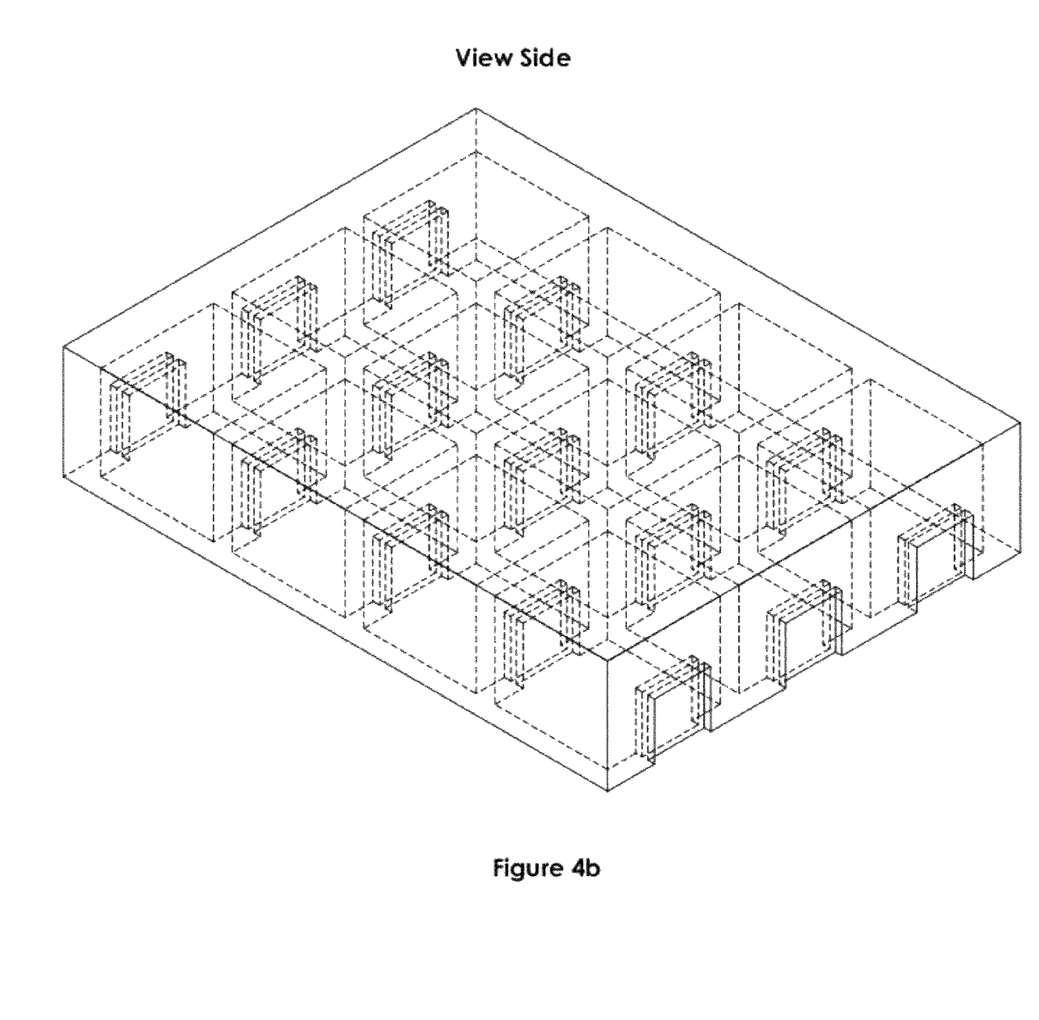
Figure 8A:
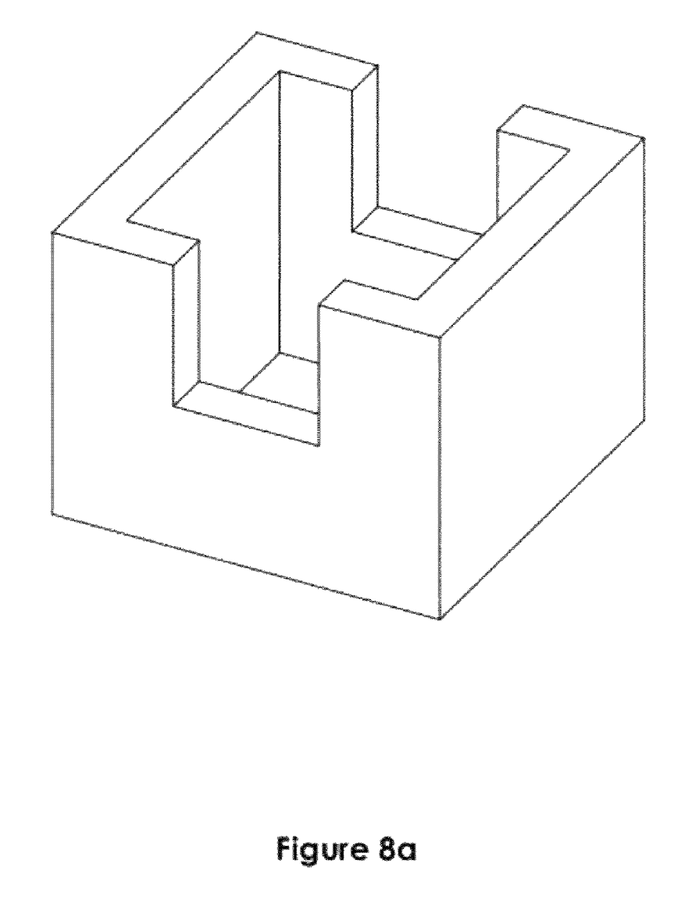
FIGS. 8a and 8b are three-dimensional view of an electrophoretic display having open partition walls.
Figure 8B:
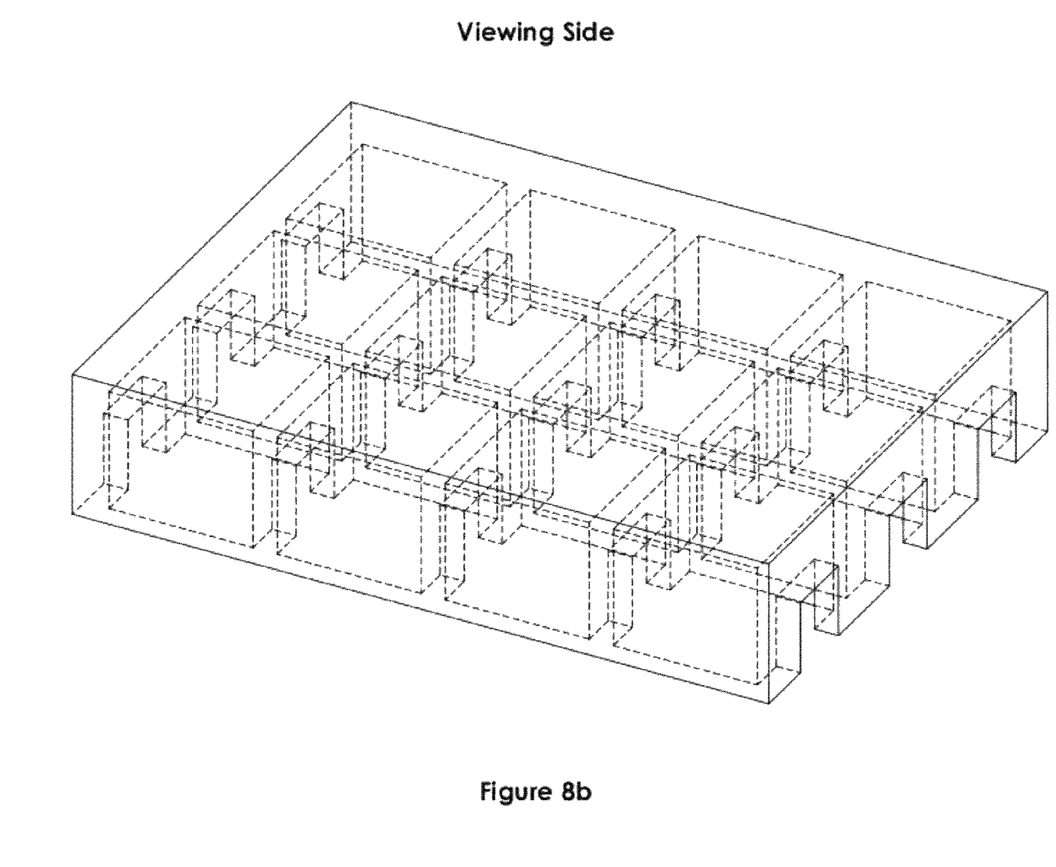

The second aspect of the invention is directed to an electrophoretic display structure in which the partition walls are indented as shown in FIGS. 4 and 8.

FIG. 4a is a three-dimensional view of a display cell having two indented partition walls on the opposite sides of the display cell. FIG. 4b is a three-dimensional view of an electrophoretic display structure having display cells with indented partition walls. The display cells of FIG. 4a have been turned 180° in the structure of FIG. 4b.

The partition walls in FIGS. 4a and 4b are indented but the indented areas still separate the neighboring display cells. En other words, the indented partition walls do not have open passageways.

While two indented partition walls are shown in FIG. 4a, a square-shaped display cell may have only one indented partition wall or may have two, three or four indented partition walls. In another embodiment, for a hexagon-shaped display cell, the display cell may have one, two, three, four, five or six indented partition walls.

Figure 5:
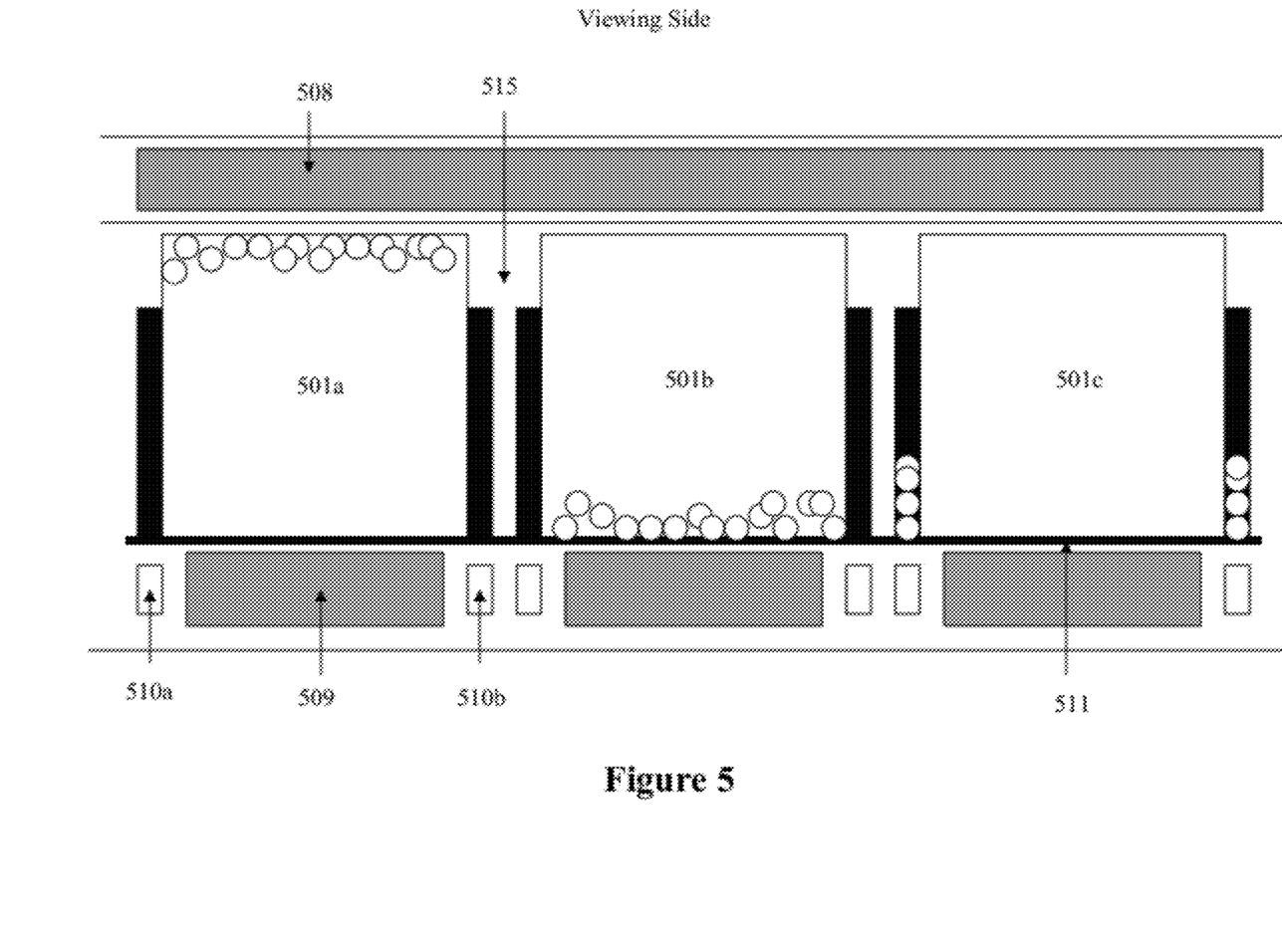
FIG. 5 is a cross-section view of an electrophoretic display capable of displaying multiple color states.

FIG. 5 illustrates how a display structure of FIG. 4b operates. In this example, it is shown that each display cell has two indented partition walls (515) on the two opposite sides of a square-shaped display cell. The side electrodes (510a and 510b) are placed underneath the indented areas of the partition walls.

As shown in FIG. 5, the charged pigment particles are allowed to move in either the vertical (up/down) direction or the planar (left/right) direction. For example, for display cell (501a), when the voltage of the common electrode (508) is set low, and the voltages of the center electrode (509) and the side electrodes (510a and 510b) are set high, the white particles would migrate to be near or at the common electrode (508). As a result, the white color (i.e., the color of the particles) is seen at the viewing side.

In display cell 501b, when the voltage of the common electrode (508) is set high and the voltages of the center electrode (509) and side electrodes (510a and 510b) are set low, the white particles would migrate to be near or at the bottom of the display cell. As a result, the color of the fluid (e.g., red, green or blue) would be seen at the viewing side.

In display cell 501c, when the voltages of the side electrodes (510a and 510b) are set low and the voltages of the common (508) and center (509) electrodes are set high, the white particles would migrate into the indented areas. As a result, the white charged pigment particles are hidden in the indented areas, and therefore are not visible from the viewing side. The color seen at the viewing side would be the color of the background layer (511) (i.e., black).

Figure 6A:
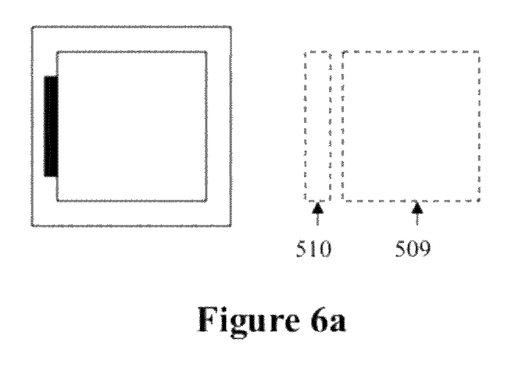
FIGS. 6a-6c show the top view of display structures and their corresponding electrode configurations.
Figure 6B:
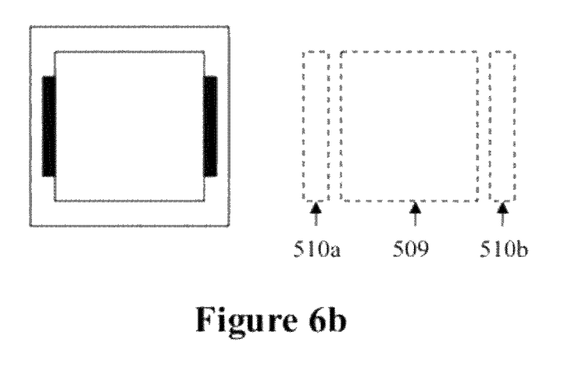
Figure 6C:
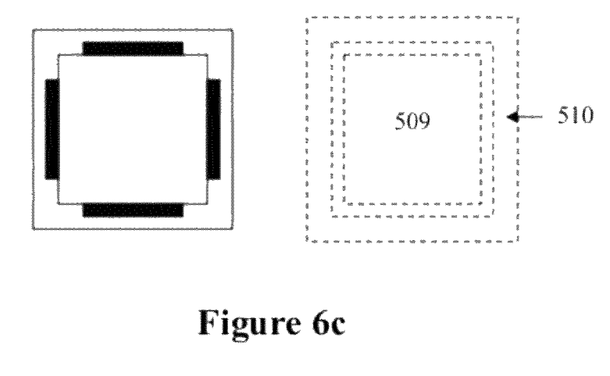

FIGS. 6a-6c are the top view of display cells and the electrode configuration on the second layer associated with the display cell.

FIG. 6a shows the configuration of the side electrode (510) and the center electrode (509) for a display cell having only one indented partition wall. FIG. 6b shows the configuration of the side electrodes (510a and 510b) and the center electrode (509) of a display cell having two indented partition walls. FIG. 6c shows the configuration of the side electrode (510) and the center electrode (509) of a display cell having four indented partition walls.

Figure 7:
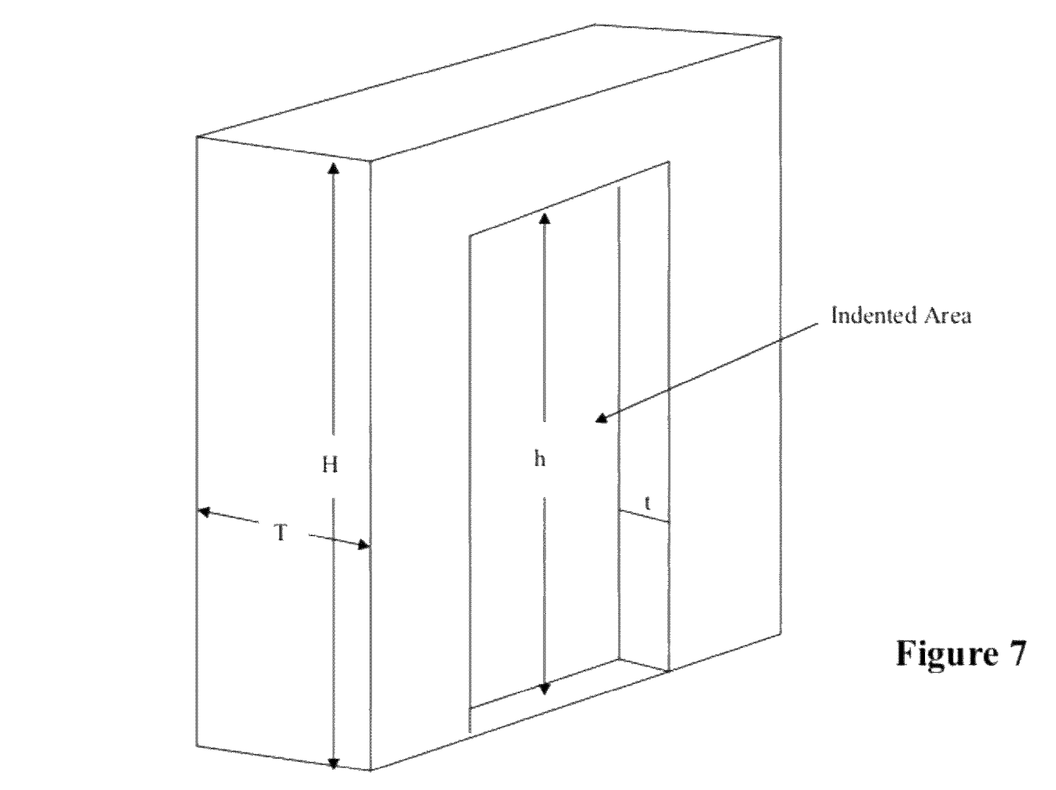
FIG. 7 shows the dimensions of an electrophoretic display having indented partition walls.

In one embodiment as shown in FIG. 7, the thickness (t) of one indented area is about 5% to about 80%, of the total thickness (T) of a partition wall and the height (h) of the indented area is about 5% to about 80%, of the height (H) of a partition wall.

In FIGS. 4 and 5, the indented areas are shown in a rectangular shape. The shape of the indented area is not limited to the rectangular shape and it may vary (such as a rectangular with an arched top), as long as it serves the same function and purpose of the indented area of a rectangular shape as shown.

FIG. 8a is a three-dimensional view of a display cell having two open partition walls on the opposite sides of the display cell. FIG. 8b is a three-dimensional view of an electrophoretic display structure having display cells with open partition walls. The display cells of FIG. 8a have been turned 180° in the structure of FIG. 8b.

In the structure of FIG. 8b, the open partition wall area becomes an open passage area. In other words, the display fluid in one display cell may interchange with the display fluid in a neighboring display cell when the two display cells are separated by the open partition walls. Because the display fluid can move freely underneath the open areas in the partition walls, in this structure, the partition wall areas essentially have become "active".

The opaque wall will create a hiding place for the particles. Alternatively, the ceiling of the open areas in the partition walls may be painted a color (e.g., black). The colored ceiling may be achieved by a process described below.

In one embodiment, the open partition walls are only on two opposite sides of a square-shaped display cell. The shape of the open areas is not limited to a rectangular shape as shown; it may vary as long as it serves the intended purpose and function.

Figure 9:
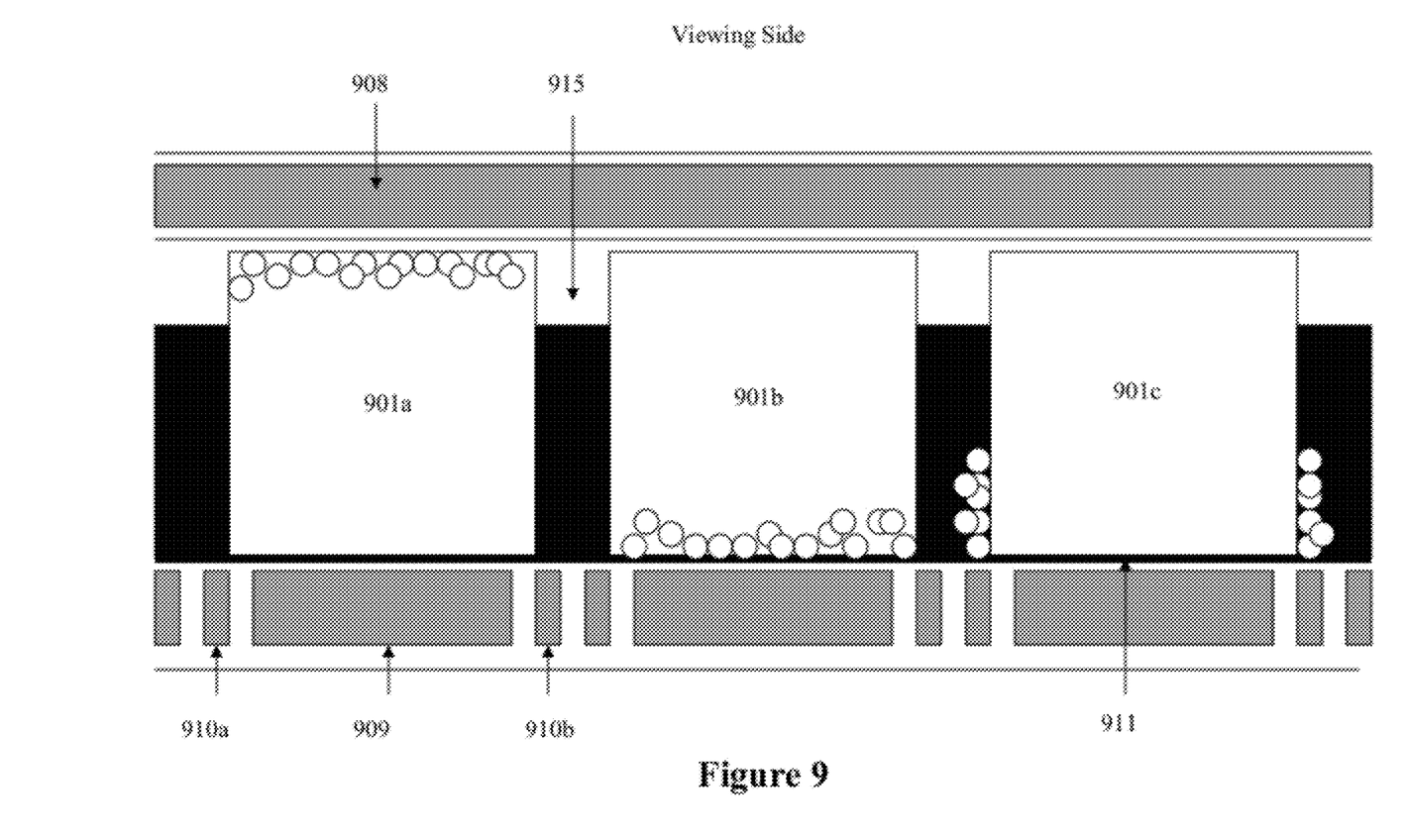
FIG. 9 is a cross-section view of an electrophoretic display capable of displaying multiple color states.

FIG. 9 illustrates how a display structure of FIG. 8b operates. In this example, it is shown that each display cell has two open partition walls (915) on the two opposite sides of a square-shaped display cell. The side electrodes (910a and 910b) are placed underneath the open areas of the partition walls.

The height of the open areas is preferably about 5% to about 80%, of the height of the partition wall.

As shown in FIG. 9, the charged pigment particles are allowed to move in either the vertical (up/down) direction or the planar (left/right) direction. For example, for display cell (901a), when the voltage of the common electrode (908) is set low, and the voltages of the center electrode (909) and the side electrodes (910a and 910b) are set high, the white particles would migrate to be near or at the common electrode (908). As a result, the white color (i.e., the color of the particles) is seen at the viewing side.

In display cell 901b, when the voltage of the common electrode (908) is set high and the voltages of the center electrode (909) and side electrodes (910a and 910b) are set low, the white particles would migrate to be near or at the bottom of the display cell. As a result, the color of the fluid (e.g., red, green or blue) would be seen at the viewing side.

In display cell 901c, when the voltages of the side electrodes (910a and 910b) are set low and the voltages of the common (908) and center (909) electrodes are set high, the white particles would migrate into the open areas. As a result, the white charged pigment particles are hidden in the open areas, and therefore are not visible from the viewing side especially if the open partition walls have a colored or black ceiling. The color seen at the viewing side would be the color of the background layer (911) (i.e., black).

Figure 10:
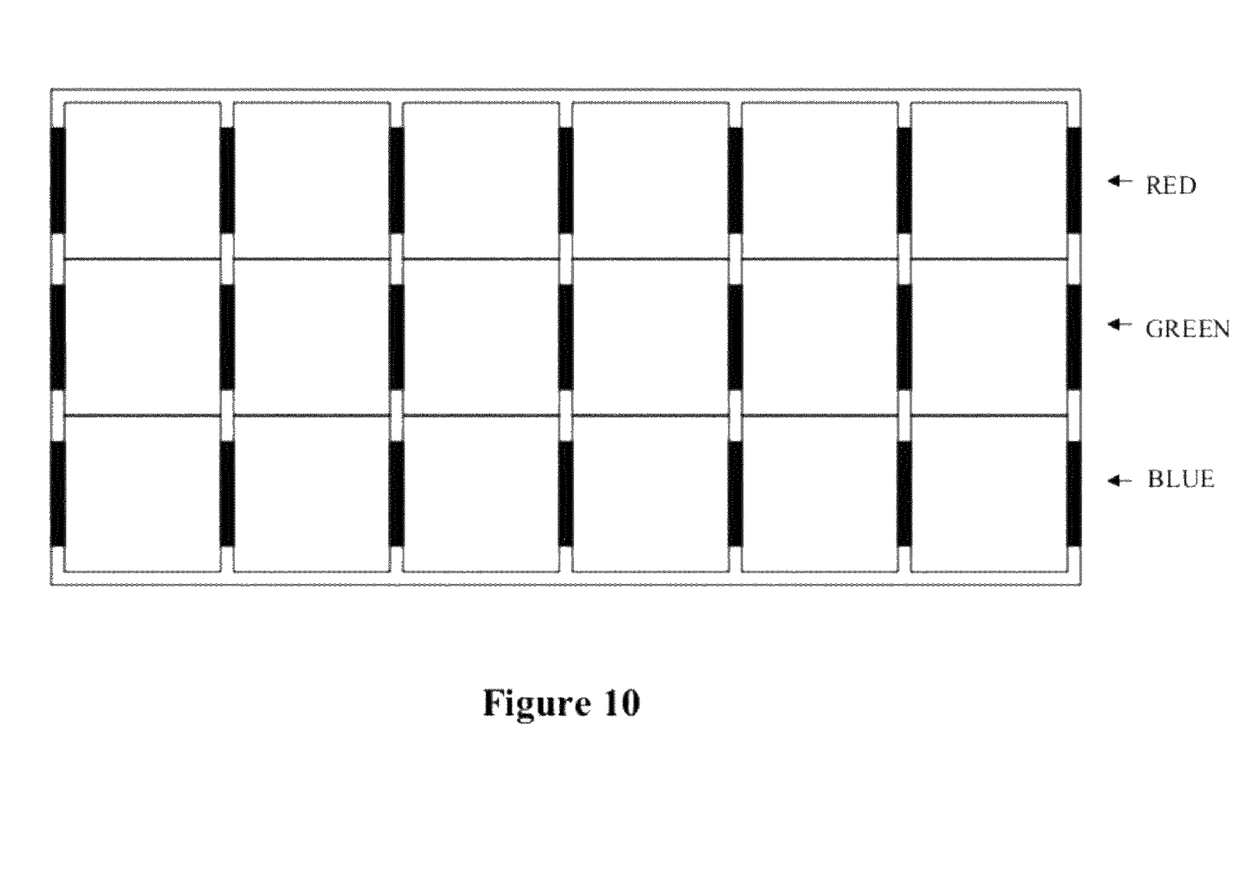
FIG. 10 is a top view of a striped color display device.

This type of display structure is particularly suitable for a striped color display device as shown in FIG. 10. In the display device as shown, all display cells of the first row are filled with a display fluid of the red color; all display cells of the second row are filled with a display fluid of the green color; and all display cells of the third row are filled with a display fluid of the blue color.

Each display cell in this case represents one color sub-pixel. There are no open areas in the partition walls in the horizontal direction. The partition walls in the vertical direction have open areas which allow the display fluid of the same color to move through, in each row.

The display cells with red, green and blue display fluids respectively aligned to the sub-pixels on a backplane to form one pixel unit of an electrophoretic display device.

Figure 11:
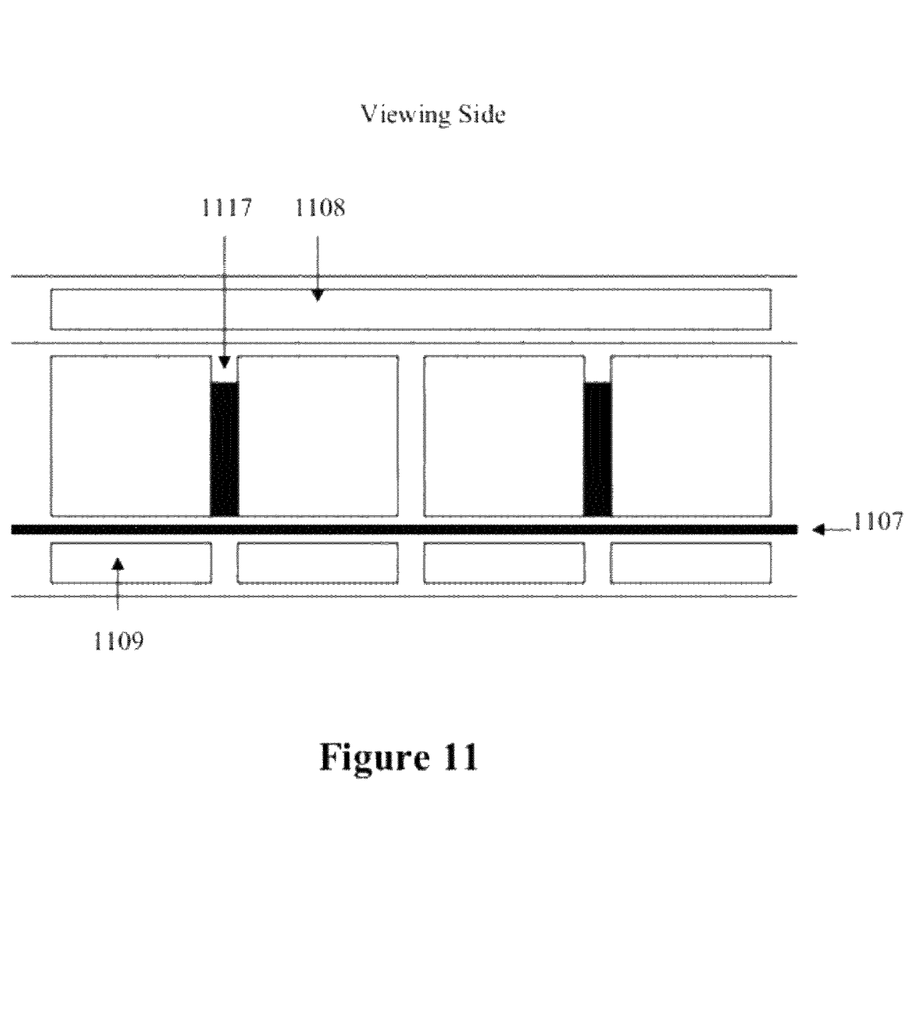
FIG. 11 is the cross-section view of an electrophoretic display having open partition walls.
Figure 12:
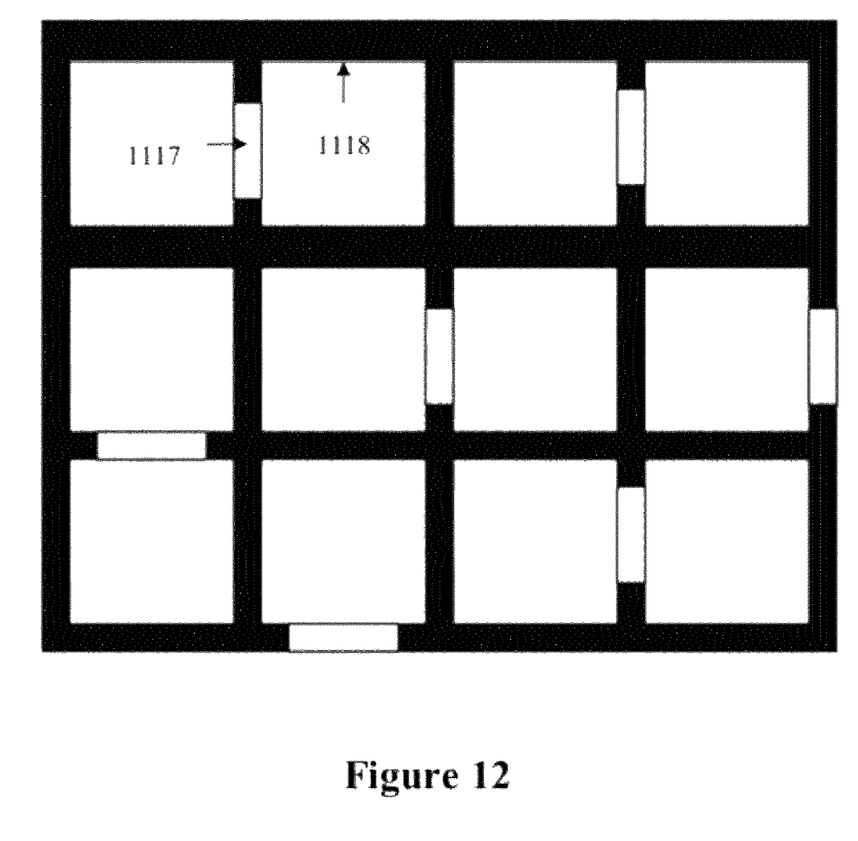
FIG. 12 is a top view which illustrates how the display of FIG. 11 operates with increased contrast ratio.

The display structure of FIG. 8b is also suitable for a binary color system. As shown in FIGS. 11 and 12, the open partition walls (1117) randomly appear in the structure. The non-open partition walls are marked 1118. For illustration purpose, it is assumed that the display device shown in the figure is a black/white binary color display. In other words, the display fluid in this example comprises white particles dispersed in a black color solvent. To ensure high contrast ratio, an auxiliary layer (1107) is placed underneath the display cells. The auxiliary layer, for example, is of the black color and it may be an adhesive layer.

FIG. 12 illustrates how the display structure of FIG. 11 operates.

When the white particles move to be at or near the common electrode (1108), the white color is seen in the display cells from the viewing side. In the non-open partition wall area (1118), the black color from the auxiliary layer (1107) is seen from the viewing side. In the open partition wall area (1117), the white color of the particles is seen, as the display cell structure is transparent.

When the white particles move to be at or near the center electrode (1109), the black color is seen in the display cells from the viewing side. In the non-open partition wall area (1118), the black color from the auxiliary layer is seen from the viewing side. In the open partition wall area (1117), the black color of the solvent is seen, although the black color is not as intense as that of the display cell area because in the open partition wall area the fluid level is not as deep as that in the display cell area.

The increase of the overall black color intensity results in an overall higher contrast ratio of the binary color display device.

All of the display structures described in the present application can be prepared by techniques such as microembossing. An embossing composition is usually first coated on an ITO layer. A male mold is then pressed onto the embossing composition from the top to form display cells of a desired configuration (e.g., slanted, indented or open partition walls). After the display cells are formed, the display fluid may be filled into the display cells and the filled display cells are optionally sealed. In order for the partition walls to achieve the function of hiding the particles, the structure formed after the embossing process is turned 180° in forming a display device.

The embossing male mold can be made using a diamond turn method. A photolithography method may also be used; but two masking steps are needed to create the open partition walls. All of the display structures of the present invention may be manufactured by a continuous or semi-continuous process in a roll to roll manner as described in U.S. Pat. No. 6,930,818, the content of which is incorporated herein by reference in its entirety.

In order to color the top surface of the partition walls without contaminating the display cells, a masking layer may be applied before spraying the black ink. An aqueous masking solution can be used in combination with a liquid black ink and the masking layer may be stripped with water to remove any black paint in the masking area. Details of the processes for coloring the top surface of the partition walls black may be found in U.S. Pat. No. 6,829,078, the content of which is incorporated herein by reference in its entirety.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display device comprising a plurality of display cells, wherein each of said display cells
   a) is filled with an electrophoretic display fluid charged pigment particles;
   b) is sandwiched between a first layer comprising a common electrode and a second layer comprising a center electrode and at least one side electrode wherein said first layer is on the viewing side;
   c) is separated by slanted partition walls from other display cells wherein each side of said slanted partition walls has an angle in the range of about 25° to about 80° from the second layer, which allows the charged pigment particles to be hidden under the slanted partition walls and not visible from the viewing side under suitable voltage setting; and
   d) comprises a background layer.

2. The display device of claim 1, wherein said electrophoretic display fluid comprises charged pigment particles dispersed in a dielectric solvent or solvent mixture.

3. The display device of claim 1, wherein said electrophoretic display fluid comprises one type or two types of charged pigment particles.

4. The display device of claim 1, wherein the slanted partition walls are of a dark opaque color.

5. The display device of claim 4, wherein the slanted partition walls are formed from a composition comprising air pockets or a filler material.

6. The display device of claim 5, wherein said filler material is non-conductive carbon black, pigment black, silica, ZnO, $TiO_2$, $BaSO_4$, $CaCO_3$ or polymer particles.

7. The display device of claim 2, which is capable of displaying the color of the charged pigment particles, the color of the solvent or solvent mixture, or the color of the background layer.

8. The display device of claim 7, wherein the color of the background layer is black.

9. The display device of claim 1, wherein each side of said slanted partition walls have has an angle in the range of about 50° to about 80° from the second layer.

10. The display device of claim 1, wherein the slanted partition walls are trapezoid-shaped.

11. A display device comprising a plurality of display cells, wherein each of said display cells
    a) is filled with an electrophoretic display fluid comprising charged pigment particles dispersed in a dielectric solvent or solvent mixture;
    b) is sandwiched between a first layer comprising a common electrode and a second layer comprising a center electrode and one or more side electrodes;
    c) comprises a background layer; and
    d) is separated from other display cells by one or more indented partition walls having indented areas, wherein said side electrodes are underneath said indented areas of the indented partition walls to allow displaying the color of the background layer when the charged pigment particles are hidden in the indented areas of the indented partition walls and not visible from the viewing side.

12. The display device of claim 11, wherein said electrophoretic display fluid comprises charged pigment particles dispersed in a dielectric solvent or solvent mixture.

13. The display device of claim 12, wherein said electrophoretic display fluid comprises one type or two types of charged pigment particles.

14. The display device of claim 11, wherein said indented partition walls do not have open passageways.

15. The display device of claim 12, which is capable of displaying the color of the charged pigment particles, the color of the solvent or solvent mixture, or the color of the background layer.

16. The display device of claim 14, wherein the indented areas are of a rectangular shape, optionally with an arched top.

17. The display device of claim 11, wherein the indented partition walls are open partition walls having open areas.

18. The display device of claim 17, wherein the ceiling of the open areas is painted black.

19. The display device of claim 17, wherein the open areas are of a rectangular shape, optionally with an arched top.

20. The display device of claim 17, wherein said open partition walls randomly appear in the display.

* * * * *